United States Patent
Maddalozzo, Jr. et al.

(10) Patent No.: US 6,460,060 B1
(45) Date of Patent: Oct. 1, 2002

(54) METHOD AND SYSTEM FOR SEARCHING WEB BROWSER HISTORY

(75) Inventors: John Maddalozzo, Jr.; Gerald Francis McBrearty; Johnny Meng-Han Shieh, all of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/237,448

(22) Filed: Jan. 26, 1999

(51) Int. Cl.⁷ .............................................. G06F 17/21
(52) U.S. Cl. ...................................... 707/513; 707/526
(58) Field of Search ................................ 707/513, 500, 707/512, 526

(56) References Cited

U.S. PATENT DOCUMENTS

| | | | |
|---|---|---|---|
| 6,009,429 A | * 12/1999 | Greer et al. | 707/10 |
| 6,049,812 A | * 4/2000 | Bertram et al. | 707/516 |
| 6,119,135 A | * 9/2000 | Helfman | 707/513 |
| 6,178,433 B1 | * 1/2001 | Nakamura et al. | 707/513 |
| 6,208,995 B1 | * 3/2001 | Himmel et al. | 707/104 |
| 6,243,700 B1 | * 6/2001 | Zellweger | 707/3 |
| 6,311,216 B1 | * 10/2001 | Smith et al. | 709/226 |

* cited by examiner

Primary Examiner—Joseph H. Feild
Assistant Examiner—Maikhanh Nguyen
(74) Attorney, Agent, or Firm—Volel Emile; Bracewell & Patterson, L.L.P.

(57) ABSTRACT

A Web browser having search capabilities, automatically generates a search list from URLs in the browser's bookmark and/or history files and automatically accesses and searches each URL on the Internet or cache on the browser's computer. Each bookmark or each web page generated for the list, when accessed, may be searched for selected keywords. URL search parameters are entered into the search function, a list of URLs is automatically created from the bookmark file and/or the history file. A new browser is opened and the new browser, in background, accesses the Web or cache, connects when prompted, with each web page listed. Each web page is then searched for keywords provided by a user. Web pages containing the target keywords are then displayed in a format selected by the user on the data processing system display. Individual web pages may be accessed and displayed in successive order by utilizing the graphical "next/previous" buttons present in the web browser window.

16 Claims, 6 Drawing Sheets

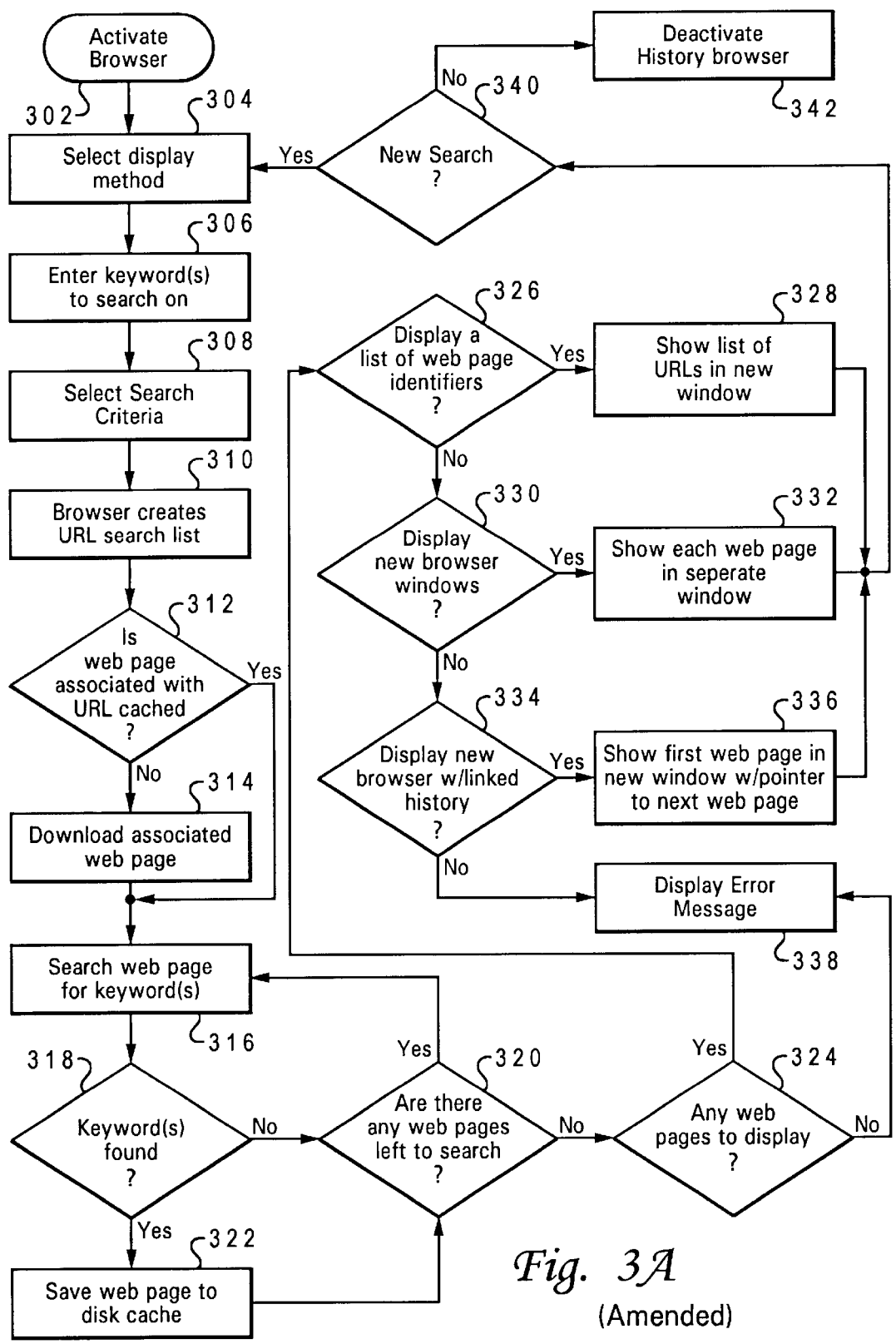
Fig. 3A
(Amended)

400

File:///C:Program Files/Browser/bookmark.html

402 — INFORMATION
    Interquote! Real time market Data
    LocalView
    Welcome to InternetWeek
    Communications companies/market guide
    Webstreet
TECH
    IBM
    TechWeb
404 — Oil Well Services & Equipment

Information about the browser history

412 — URL: http://us.yimg.com/a/ca/
Date: Tue Dec 01 08:34:55 1998

URL: http://ads.fourplus.net/part.html
Date: Tue Dec 01 08:37:34 1998

414 — URL: http://patents.uspto.gov/cgi-bin/ifetch4?
Date: Wed Dec 03 13:24:47 1998

URL: http://www.ibm.com
Date: Tue Dec 9 09:45:35 1998

*Fig. 4B*

METHOD AND SYSTEM FOR SEARCHING WEB BROWSER HISTORY

BACKGROUND OF THE INVENTION

1. Technical Field

The present invention relates in general to data processing systems capable of operating on the Internet and in particular to browser applications for operating on the World Wide Web (Internet). More particularly, the present invention relates to multiple browser applications operating simultaneously and accessing the Internet. Still more particularly, the present invention relates to a browser application operating in the background and accessing Universal Resource Locators (URLS) on the Internet.

2. Description of the Related Art

The World Wide Web (Web) is a graphic, interactive interface for the Internet (Internet is often used interchangeably with Web and that will be done here). There are different programs (web browser clients, referred hereinafter as web browser) on a data processing system (also referred to as a computer) connected to the web that are utilized to access servers (a program on another data processing system) connected to the Web. The program on the server is generally termed a "website." Websites are a collection of "web pages," where web pages are graphic displays which are usually linked together and may be downloaded to a data processing system utilizing a browser client. Each web page has a unique address, or Universal Resource Locator (URL) within the Web that is accessible by utilizing Transfer Control Protocol/Internet Protocol (TCP/IP) transactions via telecommunication networks and a modem. The address allows Internet "browser" clients (computer program applications) to connect and communicate with a HyperText Transfer Protocol (HTTP) server over the Web.

Generally, each browser client permits multiple windows in operation at the same time. Each browser window may operate independently and connect with separate web pages. Each web page visited is usually logged in a history file or object. If a user, utilizing a web browser, desires to revisit a particular web page, the user may "bookmark" the page. Bookmarking the page enters the URL into a descriptive list that may be easily accessed for multiple repeat visits by utilizing a mouse and clicking on the displayed URL (as used herein, refers to the unique address of HTTP resources as well as the content retrieved by an HTTP request including that unique address).

Many times, users have visited useful web sites and retained useful bookmarks. Quite often, however, the user forgets to make the positive action of adding the web page to the bookmark list or, adds the bookmark but forgets the title of the site. The browser client history file (or object) automatically records each web page visited and retains it for a period of time specified by the browser developer or user. Most users don't know about the history record that is automatically stored and even if they did, the record is entered in no particular order, thus making it very hard to search. Additionally, URLs may not be descriptive and if a user knew there was a subject that the user wanted to re-visit, it would be difficult to impossible to find that address in the history record. Even though an ASCII search may be made of both the bookmark and history records, the URLs (not necessarily descriptive) included may not provide any clues as to the link between the desired subject and a web page.

Additionally, there are "off-line" browsers that utilize the browser client to search specified sites for key parameters, but the user must enter an identification of the pages to be searched. Also, there are stand-alone off-line browsers that automatically access specified web pages unattended or in the background and download the web pages. Some parameters may be entered that are restricted to specific addresses, such as whether or not the page has changed as compared to a cached page from a previous visit. Generally, the search programs are unable to search a list that refers to the last n pages visited, where n is an arbitrary number, nor are the search programs able to automatically generate a list to search for web pages visited during a given time frame.

It would be desirable therefore to provide a method and system for automatically providing a pertinent list to search previously visited web pages based on specific parameters defined by a user. It would further be desirable to search, in the background while browsing the web or working on other projects in the foreground. Also, it would be desirable to at least search according to: specified keywords, the last n number of pages visited and a date specific time frame in conjunction with keyword searches.

SUMMARY OF THE INVENTION

It is therefore one object of the present invention to provide a method for automatic keyword searching, in the background, on the Internet or in a cache of web pages stored on a data processing system.

It is another object of the present invention to provide a method for automatically searching previously visited web pages, not bookmarked, for specified keywords or for multiple pages visited during a specified period whether stored in a cache on the data processing system or accessible only on the Internet.

It is yet another object of the present invention to provide a method for displaying web pages that contain a specified keyword(s) at the conclusion of an automatic search.

The foregoing objects are achieved as is now described. A Web browser having search capabilities, automatically generates a search list of websites to be searched, from URLs in the browser's bookmark and/or history files, then automatically accesses and searches each URL on the Internet or cache on the browser's computer. Each bookmark or each web page generated for the list, when accessed, may be searched for selected keywords. URL search parameters are entered into the search function. A list of URLs is automatically created from the bookmark file and/or the history file. A new browser is opened and the new browser, in the background, accesses the Web or cache, connects when prompted, with each web page listed. Each web page is then searched for keywords provided by a user. Web pages containing the target keywords are then displayed in a format selected by the user on the data processing system display. Individual web pages may be accessed and displayed in successive order by utilizing the graphical "next/previous" buttons present in the web browser window.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3A depicts a high-level flow diagram of a process for utilizing a web browser having search capability to automatically access and search remote web pages, or web pages stored in cache, for keywords, in accordance with a preferred embodiment of the present invention;

FIG. 4A depicts a portion of a bookmark file for a browser, in accordance with a preferred implementation of the present invention;

FIG. 4B is a portion of the history file for a browser, in accordance with a preferred implementation of the present invention.

DETAILED DESCRIPTION OF THE PREFERRED EMBODIMENT

Figure 1:
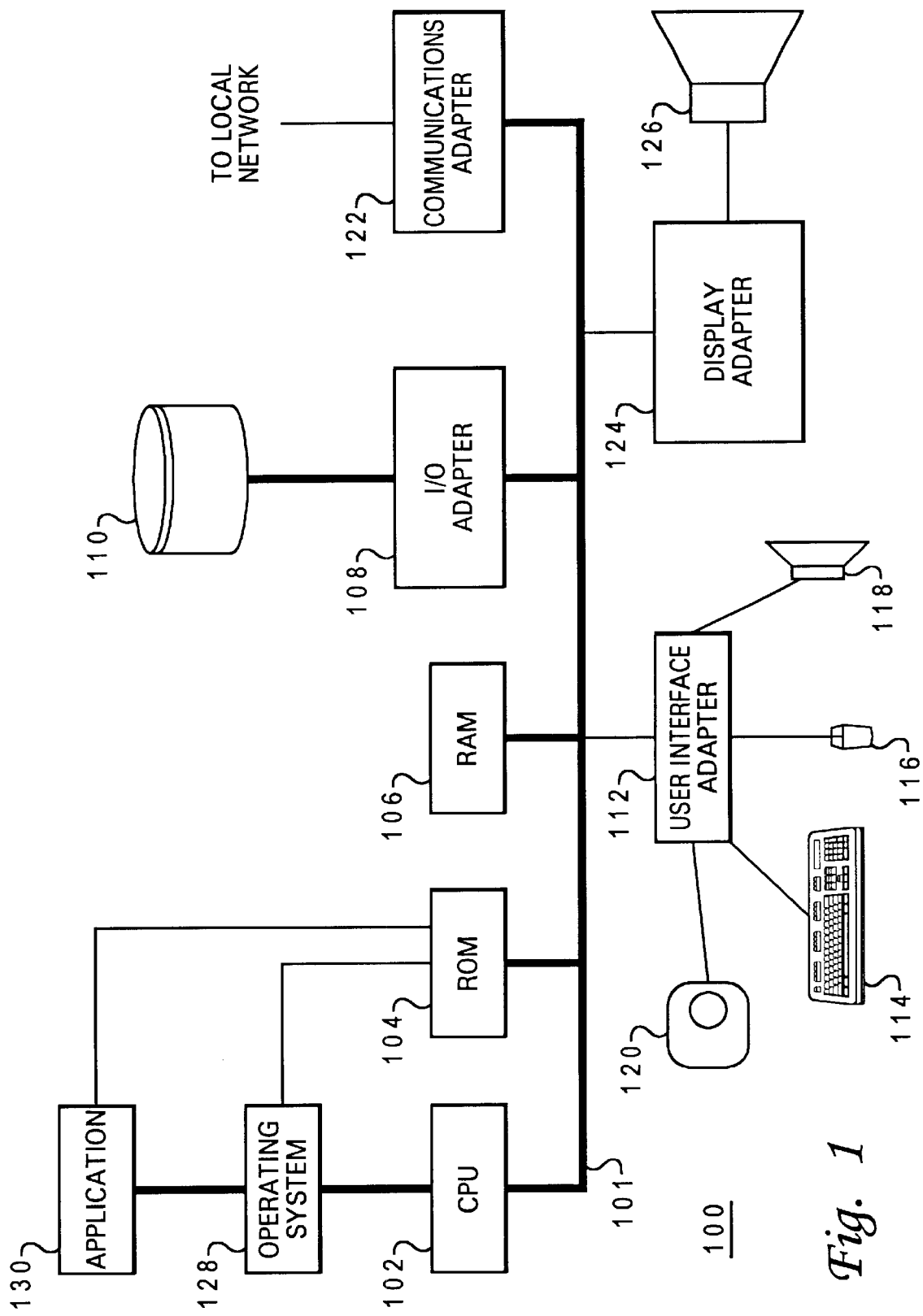
FIG. 1 depicts a typical data processing system, in which a preferred embodiment of the present invention may be implemented.

With reference to the figures and in particular with reference to FIG. 1, a typical data processing system, in which a preferred embodiment of the present invention may be implemented, is depicted. A central processing unit (CPU) 102, such as one of the PC microprocessors available from International Business Machines Corporation (IBM), is provided and interconnected to various other components by system bus 101. An operating system 128 runs on CPU 102, provides control and is used to coordinate the function of various components of FIG. 1. Operating system 128 may be one of the commercially available operating systems such as OS/2™ operating system available from IBM. A program, application 130, runs in conjunction with operating system 128 and provides output calls to operating system 128 which implement the various functions to be performed by application 130.

Read only memory (ROM) 104 is connected to CPU 102, via bus 101 and includes the basic input/output system (BIOS) that controls basic computer functions. Random access memory (RAM) 106, I/O adapter 108 and communications adapter 122 are also interconnected to system bus 101. It should be noted that software components, including operating system 128 and application 130, are loaded into RAM 106, which is data processing system's 100 main memory. I/O adapter 108 may be a small computer system interface (SCSI) adapter that communicates with disk storage device 110. Communications adapter 122 interconnects bus 101 with an outside network enabling data processing system 100 to communicate with other such systems over a local area network (LAN) or wide area network (WAN), which includes the Internet. I/O devices are also connected to system bus 101 via user interface adapter 112 and display adapter 124 utilizing various components such as a digital to analog converter (not shown) and the like. By using the aforementioned I/O devices, a user is capable of inputting information to the system through keyboard 114, trackball 120 or mouse 116, and receiving output information from the system via speaker 118 and display 126.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2:
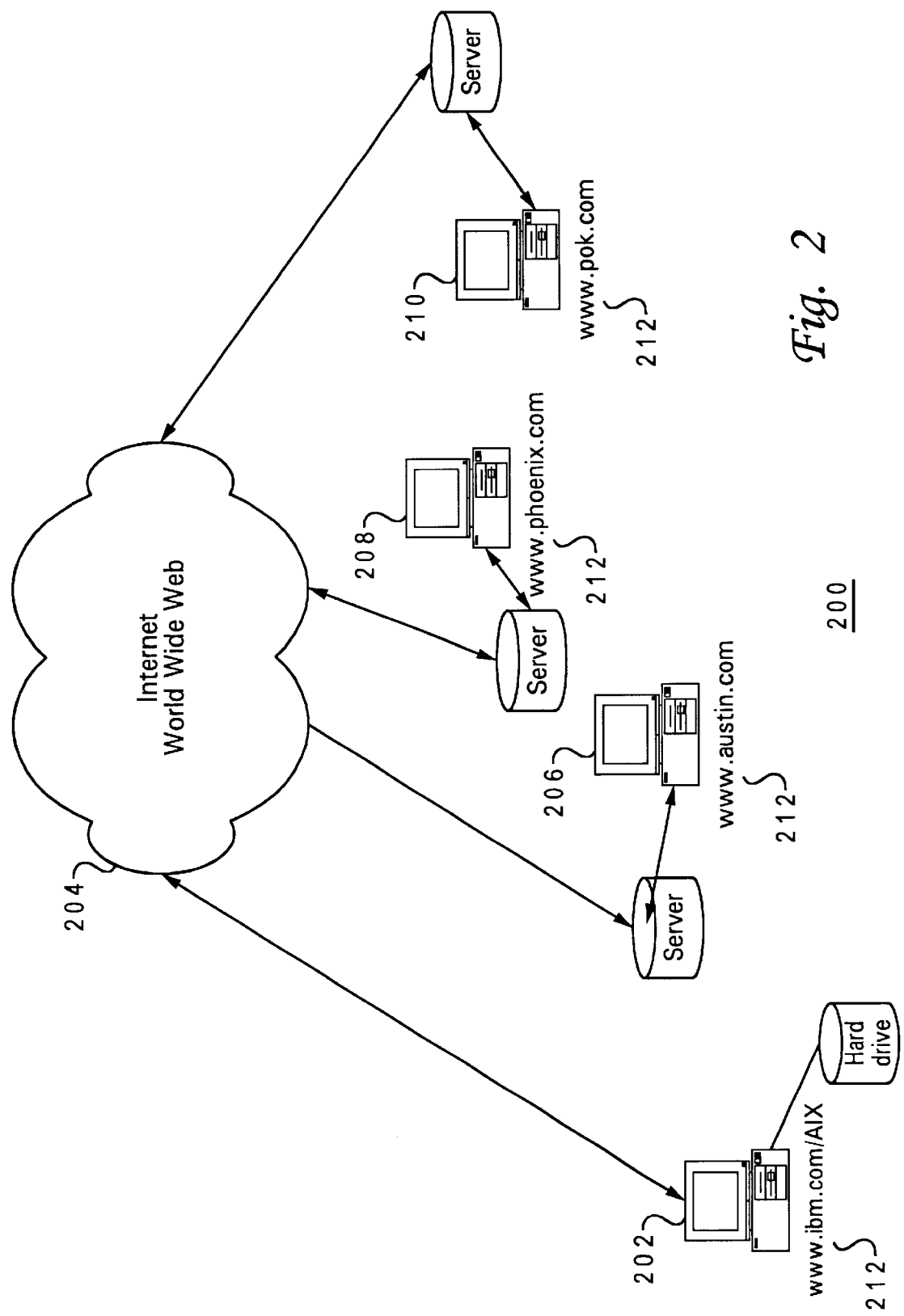
FIG. 2 is a high-level block diagram of a data processing system network utilized within the Internet, in accordance with a preferred embodiment of the present invention.

Referring now to FIG. 2, a high-level block diagram of a data processing system network in accordance with a preferred embodiment of the present invention, is illustrated. System 200, is comprised of a web browser search client 202 (the present invention) that is usually included in system memory and utilizes system processors on a user's data processing system. System 202 connected to Internet (Web) 204 and servers 206, 208 and 210. To those skilled in the art, it is well known that the Internet, or Web, has millions of connections of users and servers.

Server 206 is shown having URL 212 of www.austin.com. The URL, as discussed previously, is a unique address on the Web assigned to only one web page and is capable of being stored on the hard drive of any data processing system hard drive. Search client 202 (a browser application on a data processing system) is seeking a particular address, in this case www.phoenix.com, and may access World Wide Web 204 which provides a connection to server 208. The user utilizing search client 202 may or may not bookmark the address, but the browser will likely store the address in a history record for a specific period of time (usually the history record is set to delete URLs that are beyond a certain date to prevent overloading the data processing system storage).

Search client 202 may be utilized to link to other web pages on servers throughout the Internet before shutting down, thereby adding confusion as to which page a desired subject may be located. If a particular subject was found on server 208 and a bookmark was added to the browser client bookmark list, it is probable the user will not remember the web page URL that contained the subject matter. The present invention permits the user to search for the subject matter in the background while operating on the Web. Even though the user may not remember which web page contains the subject matter in question, a search utilizing addresses contained in the history record/log may be made of each web page visited.

Referring now to FIG. 3A, a high-level flow diagram of a process for utilizing a web browser to automatically access and search remote web pages, or web pages stored in cache, for keyword(s) in which a preferred embodiment of the present invention may be implemented, is depicted. The process begins with step 302, which depicts a user activating the browser to begin a keyword search. The process continues to step 304, which illustrates the user selecting a display method. The process then proceeds to step 306, which depicts the user entering keyword(s) for the browser to utilize in the search effort. The step next passes to step 308, which illustrates the user selecting search criteria for the URLs (time period, only in cache, only on the Internet, last visited, etc.) and whether the browser utilizes the bookmark file, the history file or both, to construct a URL list to search.

The process then proceeds to step 310, which depicts the browser constructing the URL search list. Next the process passes to step 312, which illustrates a determination of whether or not the web page associated with a URL in the URL search list is cached on the hard drive of the user's data processing system. If the associated web page is cached on the hard drive of the user's data processing system, the browser may search the web page without the need to access the Internet. If the web page is not cached on the hard drive, the process proceeds to step 314, which depicts the browser accessing the associated web page on the Internet/Web and downloading the web page to a cache on the hard drive. The process then proceeds to step 316, which illustrates the browser searching the downloaded associated web page, or the web page from the cache, for the keyword(s).

Returning to step 312, if the determination is made that the web page is cached, the process instead proceeds to step 316 and searches for the keyword(s). The process then passes to step 318, which depicts a determination of whether the keyword(s) is located within the web page. If the keyword(s) is located, the process then passes to step 322, which illustrates the browser saving the web page to disk cache. The process then continues to step 320. Returning to step 318, if the determination is made that no keyword(s) was found, the process instead proceeds to step 320, which depicts a determination of whether there are any more web page associated with URLs in the URL search list, left to search. If so the process returns to step 316 and the cycle repeats until there are no associated web pages to search. If there are no more web pages to search, the process next proceeds from step 320 to step 324, which illustrates a determination of whether there are any web pages to display.

If there are no web pages to display, the process then passes to step 338, which depicts the browser displaying an error message. If the determination is made that there are web pages to display, the process instead proceeds from step 324 to step 326, which illustrates a determination of whether or not to display a list or web page identifiers (URLs for example) for each of the retrieved web pages. If so, the process passes to step 328, which depicts the process displaying a listing of retrieved web pages in a new browser window. If the determination was made not to display a list of web page identifiers, the process continues to step 330, which illustrates a determination of whether or not to display the retrieved web pages utilizing newly originated browser windows. If so, the process proceeds to step 332, which depicts the process displaying the retrieved web pages in separate browser windows.

If the determination is not to display in separate browser windows, the process instead passes from step 330 to step 334, which illustrates a determination of whether to display the retrieved web pages in a new browser window and including link history. If the determination is made not to display the retrieved web pages in a new browser window including linked history, the process passes to step 338 and an error message is displayed. If so, the process next passes to step 336, which depicts the browser displaying the first retrieved web pages in a new window with a pointer to the next retrieved web pages.

The process then proceeds to step 340, which is a determination of whether or not to mount a new search. If yes, the process continues to step 304 and the search cycle repeats. If it is determined that there will be no new search, the process then passes to step 342, which depicts the user deactivating the search window.

To conduct a search of the previous web pages visited, a user will provide specific parameters for the search. The search client automatically generates a search list of URLs from the history log, the bookmark list or both. The user may specify the period of time to search (i.e., within the last 3 days) and specify keyword(s) for searching within the Internet accessed, or cached URLS. Additionally, the search client may search only cached, only non-cached URLs or both cached and non-cached URLs. Further, the user may restrict a search to URLs that match or do not match any URL address or URL title (i.e., it is known that the subject is not located on this URL), in the generated list, prior to searching within a URL for a specified keyword(s).

Figure 3B:
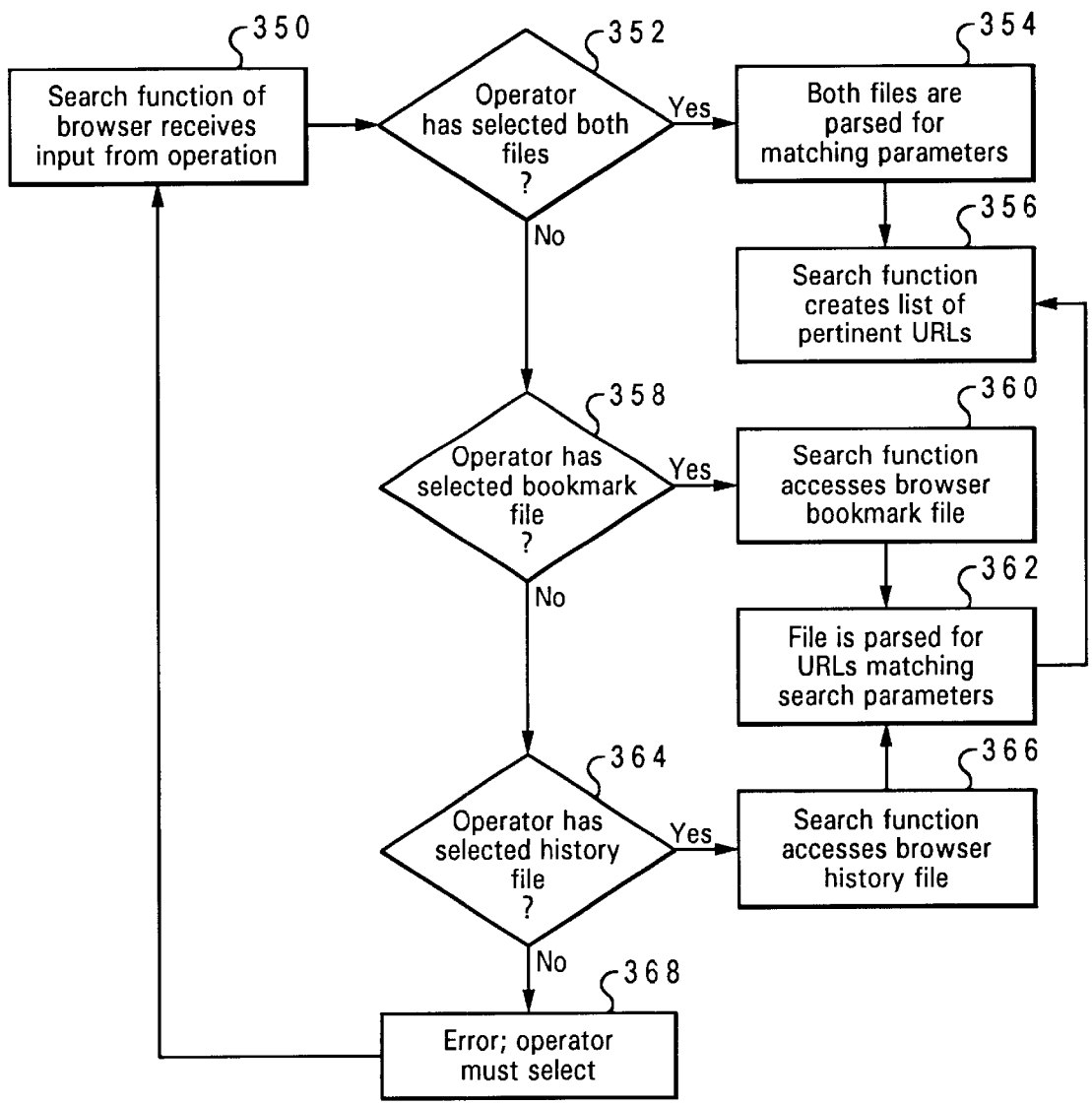
FIG. 3B, illustrates a process for creating a list for searching URLs retrieved from a bookmark file or history file associated with an Internet browser in accordance with the present invention.

Referring to FIG. 3B, a process for creating a list for searching URLs retrieved from a bookmark file or history file associated with an Internet browser in accordance with the present invention, is illustrated. The process begins with step 350, which depicts the search function of the web browser receiving input from the web browser operator consisting of keywords, dates, pages visited, which files to create a list from, etc. The process proceeds to step 352, which illustrates a determination of whether the operator has selected the web browser bookmark file and the history file from which to create a search list. If the operator has selected both, the process passes to step 354, which depicts the search function accessing and parsing both files comparing input parameters for matching parameters. The process then proceeds to step 356, which illustrates the search function creating a list of URLs that match the parameters input by the operator.

If the determination in step 352 is that the operator has not selected the both files, the process instead passes to step 358, which illustrates a determination of whether or not the operator has chosen the web browser bookmark file. If so, the process proceeds to step 360, which depicts the search function accessing the bookmark file. The process then proceeds to step 362, which illustrates the search function parsing the bookmark file attempting to match input parameters to URLs. Next, the process continues to step 356, which illustrates the search function creating a search list of URLs that match the parameters input by the operator.

Returning to step 358, if the determination is made that the operator has not selected the bookmark file, the process proceeds instead to step 364, which depicts a determination of whether the operator selected the history file to search. If the history file is selected, the process then proceeds to step 366, which illustrates the search function accessing the browser history file. The process next passes to step 362, which depicts the search function parsing the history file and attempting to match search parameters to URLs. The process then passes to step 356, which illustrates creating the search list of matching URLs. Returning to step 364, if the determination is made that the operator has not selected both files, the process instead proceeds to step 368, which depicts the search function returning an error message instructing the operator to select one or both files. The process then returns to step 350 and awaits input from the operator.

Referring now to FIG. 4A, a portion of a bookmark file for a browser, in accordance with a preferred implementation of the present invention, is depicted. Names of bookmarked URLs are shown, with each name in the list being uniquely associated with a specific URL (not shown). As discussed previously, the present invention requires no entry of URLs to search as required by offline browsers. The browser automatically searches all browser bookmark and/or history entries. File designation 400 is acquired by the browser and searched, in this instance utilizing American Standard Code for Information Interchange (ASCII) as a search method for key words, or parameters, that have been input by the user. The browser searches URLs associated with categories 402 and web page titles 404 applying search parameters.

Referring to FIG. 4B, a portion of the history file for a browser, in accordance with a preferred implementation of the present invention, is illustrated. File name 410 is the title of the history file and may be searched by the present invention, utilizing ASCII search methods. Even though the search is conducted utilizing ASCII, the search mechanism may not be limited to ASCII. URL 412 is an address of a specific web page on the internet and Date 414 is the date a specific URL was visited. Both the history and bookmark files may b e searched separately or combined; in cache or on the Internet.

Figure 5:
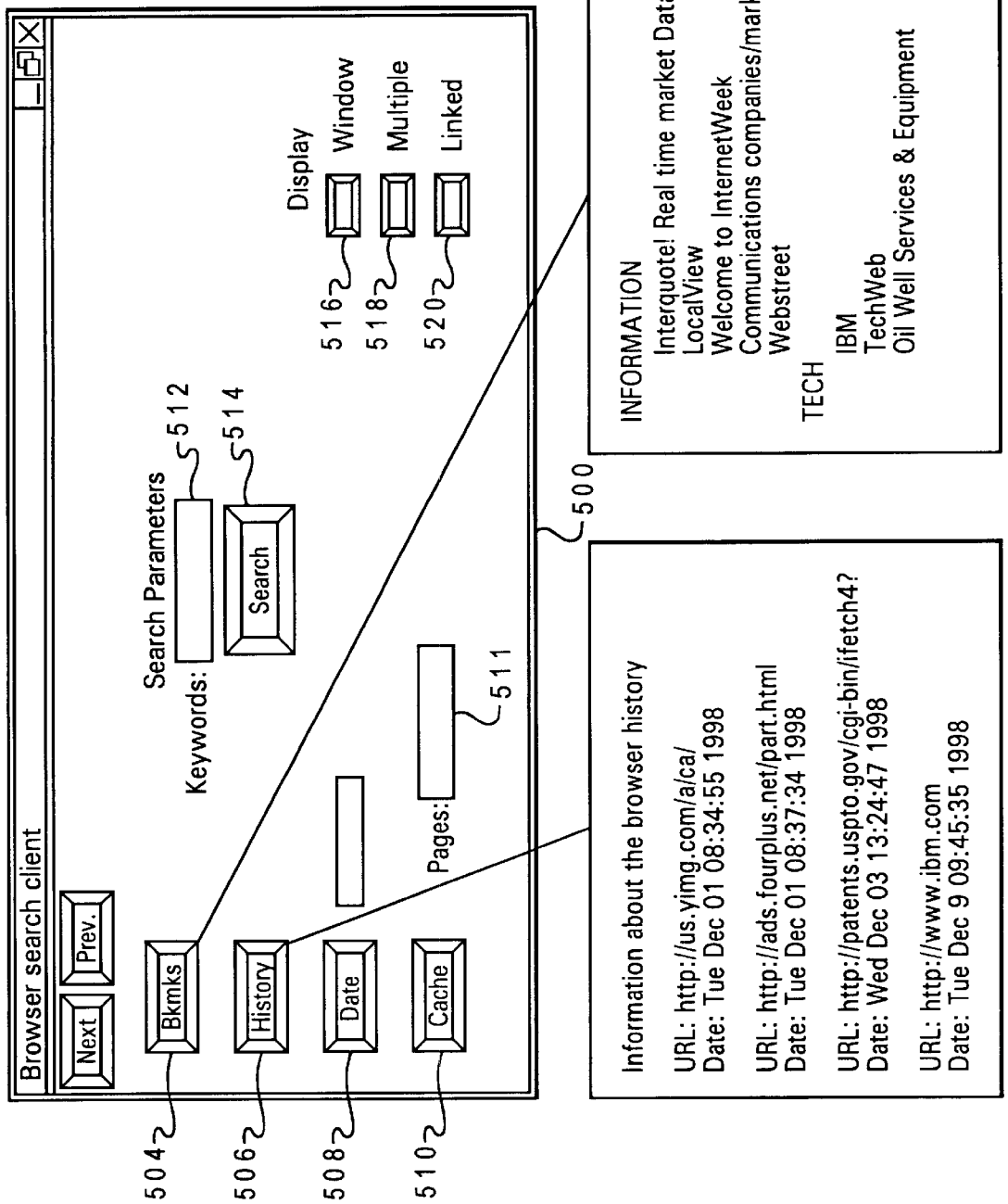
FIG. 5 depicts a browser window in accordance with a preferred implementation of the present invention.

Referring to FIG. 5, a browser window in accordance with a preferred implementation of the present invention is depicted. Browser window 500 graphic is displayed on a data processing system terminal and includes: next/previous buttons 502 that may be used to switch between URLs that have been retrieved; bookmark button 504 may be clicked to include a bookmark file in the initial search; history button 506 which may be clicked to include the history file in the initial search; date button and box 508 which may be clicked to provide a time period in which to search; cache button 510, which may be clicked to include the onboard browser cache for searching URLs that may be stored in the browser cache; pages box 511, which provides for receiving a set number of web pages to search; search parameter box 512, which allows for entry of keywords that the browser may utilize to search when a URL is found and downloaded and search button 514, which is clicked to start the search procedure. The user has a choice to display the results in one of three ways. The choice may be window 516, which provides that the results be displayed, individually in a new browser window (i.e., 5 results, 5 browser windows). If the choice is multiple 518, multiple windows display an individual web page in each window and each window is accessed by next/previous button 502. If the user selects linked 520, a list of downloaded URLS is displayed in the browser window, with each URL linked to the downloaded or cached web pages.

The browser search window requires no entry of URLs to search, as required by offline browsers. Also, the browser: permits a search of URLs whether the web pages are cached on the local hard drive or available only on the Web; permits basing a search on time periods (i.e., date last or first visited); permits basing a search on the last URL search (search for new keywords on a previous search) and permits searches of the last n number of URLs visited, with n being an arbitrary number entered by the user.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMS) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for utilizing web browser history to enhance web browsing, comprising the steps of:

searching a URL history record maintained within a client computer system for URLs that match at least one user-input search parameter, wherein said URL history record includes a URL for each of a number of web pages previously accessed by said client computer system;

assembling a URL search result list from matches found during said URL history record search;

for each URL included within said URL search result list:
determining whether an associated web page is locally stored within said client computer;
responsive to said associated web page being locally stored within said client computer, searching the content of said locally stored web page utilizing said at least one user-input search parameter; and
responsive to said associated web page not being locally stored within said client computer, downloading said non-local associated web page and searching the content of said downloaded web page utilizing said at least one user-input search parameter; and displaying results of said web page content search on said client computer system.

2. The method of claim 1, wherein said URL history record is a URL bookmark file or a URL history log file, said step of assembling a URL search result list comprising:
retrieving URLs from said URL bookmark file or said URL history log file that contain said at least one search parameter.

3. The method of claim 1, wherein said at least one search parameter is a file date.

4. The method of claim 1, wherein said at least one search parameter is a pre-determined number of URLs.

5. The method of claim 1, further comprising:
generating a new URL search result list based on a second set of search parameters applied to said URL search result list.

6. The method of claim 1, further comprising displaying said URL search result list as a list of URLs in a browser window within said client computer system.

7. The method of claim 1, wherein said step of displaying results of said web page content search on said client computer system further comprises displaying contents of each web page in a separate browser window.

8. The method of claim 1, wherein said step of displaying results of said web page content search on said client computer system further comprises displaying contents of each web page in a separate browser window, with a prompt indicating that a succeeding web page is accessible by utilizing a next/previous button.

9. A computer program product within a computer usable medium, for utilizing web browser history to enhance web browsing, comprising:
instructions within said computer usable medium for searching a URL history record maintained within a client computer system for URLs that match at least one user-input search parameter, wherein said URL history record includes a URL for each of a number of web pages previously accessed by said client computer system;
instructions within said computer usable medium for assembling a URL search result list from matches found during said URL history record search;
for each URL included within said URL search result list:
determining whether an associated web page is locally stored within said client computer;
responsive to said associated web page being locally stored within said client computer, searching the content of said locally stored web page utilizing said at least one user-input search parameter; and responsive to said associated web page not being locally stored within said client computer, downloading said non-local associated web page and searching the content of said downloaded web page utilizing said at least one user-input search parameter, and instructions within said computer usable medium for displaying results of said web page content search on said client computer system.

10. The computer program product of claim 9, wherein said URL history record is a URL bookmark file or a URL history log file, said instructions for creating said list comprising:

instructions within said computer usable medium for retrieving URLs from said URL bookmark file or said history log file that contain said at least one search parameter.

11. The computer program product of claim 9, wherein said at least one search parameter is a file date.

12. The computer program product of claim 9, wherein said at least one search parameter is a pre-determined number of URLS.

13. The computer program product of claim 9, further comprising:

instructions within said computer usable medium for generating a new URL search result list based on a second set of search parameters applied to said URL search result list.

14. The computer program product of claim 9, further comprising instructions within said computer usable medium for displaying said URL search result list as a list of URLs in a browser window within said client computer system.

15. The computer program product of claim 9, wherein said instructions within said computer usable medium for displaying results of said web page content search on said client computer system, further comprises instructions within said computer usable medium for displaying contents of each web page in a separate browser window.

16. The computer program product of claim 9, wherein said instructions within said computer usable medium for displaying results of said web page content search on said client computer system further comprises instructions within said computer usable medium for displaying contents of each web page in a separate browser window, with a prompt indicating a succeeding web page is accessible by utilizing a next/previous button.

* * * * *